US 8,854,355 B2

(12) United States Patent
Skinner et al.

(10) Patent No.: US 8,854,355 B2
(45) Date of Patent: Oct. 7, 2014

(54) SYSTEM AND METHOD OF VISUALIZING FEATURES IN AN IMAGE

(75) Inventors: John Skinner, New Berlin, WI (US); Sandeep Dutta, Waukesha, WI (US); Bernice E. Hoppel, Delafield, WI (US)

(73) Assignee: General Electric Company, Schenectady, NY (US)

( * ) Notice: Subject to any disclaimer, the term of this patent is extended or adjusted under 35 U.S.C. 154(b) by 942 days.

(21) Appl. No.: 12/635,879

(22) Filed: Dec. 11, 2009

(65) Prior Publication Data

US 2011/0141102 A1   Jun. 16, 2011

(51) Int. Cl.
*G06T 15/00*   (2011.01)
*G06T 11/00*   (2006.01)
*G06T 11/20*   (2006.01)
*G06T 19/00*   (2011.01)

(52) U.S. Cl.
CPC ............ *G06T 11/206* (2013.01); *G06T 11/008* (2013.01); *G06T 19/00* (2013.01)
USPC ........................................................ 345/419

(58) Field of Classification Search
USPC ........................................................ 345/419
See application file for complete search history.

(56) References Cited

U.S. PATENT DOCUMENTS

| | | | | |
|---|---|---|---|---|
| 8,285,012 B2* | 10/2012 | Kadomura et al. | ........... | 382/128 |
| 2004/0136491 A1* | 7/2004 | Iatrou et al. | ...................... | 378/4 |
| 2005/0245803 A1 | 11/2005 | Glenn, Jr. et al. | | |
| 2007/0133849 A1 | 6/2007 | Young et al. | | |
| 2007/0282202 A1* | 12/2007 | Maurice et al. | ............... | 600/438 |

OTHER PUBLICATIONS

EP Search Report and Written Opinion from corresponding EP Application No. 10192667.3, Mar. 30, 2011.

* cited by examiner

*Primary Examiner* — Kee M Tung
*Assistant Examiner* — Peter Hoang
(74) *Attorney, Agent, or Firm* — Ziolkowski Patent Solutions Group, SC

(57) ABSTRACT

An imaging system includes a detector configured to receive data that can be reconstructed into a three-dimensional (3D) image of an object, and a computer programmed to obtain 3D image data of the object, the 3D image data including an internal structure of the object, define a longitudinal dimension of the internal structure from the 3D image data along a length of the structure, extract a first set of parameter-of-interest data related to the internal structure from the 3D image data along a first ray extending from a first location along the length of the structure and at a first angular orientation with respect to a base vector that is generally perpendicular to the longitudinal dimension, and plot the extracted first set of parameter-of-interest data at a pixel location of a two-dimensional (2D) plot that corresponds to the first location and corresponds to the first angular orientation.

24 Claims, 8 Drawing Sheets

SYSTEM AND METHOD OF VISUALIZING FEATURES IN AN IMAGE

BACKGROUND OF THE INVENTION

Embodiments of the invention relate generally to diagnostic imaging and, more particularly, to an apparatus and method of visualizing features in an image.

Typically, imaging systems produce two- or three-dimensional images that are made available to a practitioner for visualization. Such applications include but are not limited to computed tomography (CT) and magnetic resonance (MR). These systems include applications that may be used to examine and identify elements based on their atomic number, tissue, bone, bone and calcifications within a body, and they may be used to determine a wall thickness in a canal or passageway, as examples. These applications may be enhanced by the use of contrast agents.

In CT imaging systems, an x-ray source emits a fan-shaped or cone-shaped beam toward a subject or object, such as a patient or a piece of luggage. The CT imaging system may include a conventional scintillator-based third-generation CT system, or may include an energy sensitive (ES), multi-energy (ME), and/or dual-energy (DE) CT imaging system that may be referred to as an ESCT, MECT, and/or DECT imaging system, in order to acquire data for material decomposition or effective Z or monochromatic image estimation. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces a separate electrical signal indicative of the attenuated beam received by each detector element. The electrical signals are transmitted to a data processing system for analysis, which ultimately produces multiple two-dimensional slices or three-dimensional image reconstructions that may be accessed by a practitioner.

In MR systems, when a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, or "longitudinal magnetization", $M_Z$, may be rotated, or "tipped", into the x-y plane to produce a net transverse magnetic moment $M_t$. A signal is emitted by the excited spins after the excitation signal $B_1$ is terminated and this signal may be received by a detector and processed to form multiple two-dimensional images or three-dimensional image reconstructions that may be accessed by a practitioner.

Thus, imaging systems and applications are available that have the capability to greatly enhance and improve the diagnostic capabilities of a medical practitioner. Images rendered are typically in the form of three-dimensional (3D) blocks, or slices, that may be viewed by a practitioner, and the imaging data may be useful for visualization of the human body for clinical purposes related to medical procedures and diagnosis of disease. Such imaging applications, though, can create a surplus of information for a medical practitioner to evaluate, and the challenge is more acute for wide coverage of anatomical areas. Thus, while imaging capabilities have been greatly increased in recent years (i.e., resolution, speed, coverage), it is desirable to be able to efficiently sort through the abundance of information and pinpoint areas that are of most interest to the practitioner.

As is known in the art, there are numerous methods for visualization of large 3D imaging data sets, including rendered images, color coded images, and minimum or maximum intensity projection (MIN IP/MIP). However, though these methods may yield a high resolution image to aid in diagnosis of a condition, such techniques may not allow a practitioner to quickly review images and focus on those aspects of the image that may be most important to a diagnosis. For instance, parameters that may be of interest in a medical image may include a plaque thickness in a vessel or a wall thickness in an airway. Typically, the image may be virtually rotated to observe features of the structure that may be of interest, such as plaque, wall thickness in an airway, etc. Plots of measured parameters along a vessel or plots of average wall thickness of a vessel may be generated, as examples. However, such plots tend to be time-consuming to analyze, may be difficult to interpret, or may mask or hide irregularities in the image. Thus, even though an image may actually contain data of interest to aid in diagnosis of a condition, such data may be overlooked due to a lack of time or resources.

Therefore, it would be desirable to improve visualization techniques in three-dimensional images.

BRIEF DESCRIPTION

Embodiments of the invention are directed to a method and apparatus for visualizing features in an image.

According to an aspect of the invention, an imaging system includes a detector configured to receive data that can be reconstructed into a three-dimensional (3D) image of an object, and a computer programmed to obtain 3D image data of the object, the 3D image data including an internal structure of the object, define a longitudinal dimension of the internal structure from the 3D image data along a length of the structure, extract a first set of parameter-of-interest data related to the internal structure from the 3D image data along a first ray extending from a first location along the length of the structure and at a first angular orientation with respect to a base vector that is generally perpendicular to the longitudinal dimension, and plot the extracted first set of parameter-of-interest data at a pixel location of a two-dimensional (2D) plot that corresponds to the first location and corresponds to the first angular orientation.

According to another aspect of the invention, a method of viewing imaging data includes identifying a tubular structure in three-dimensional (3D) image data of an object, identifying a central axis extending along a length of the tubular structure, extracting feature information of the tubular structure at a first longitudinal location of the central axis and extending along a vector passing from the first longitudinal location at a first angular orientation and through the structure, and generating a Cartesian plot of the tubular structure, the Cartesian plot having a first axis corresponding to longitudinal displacements of the extracted feature information of the tubular structure from an initial central point and having a second axis corresponding to angular orientations of vectors extending from the central axis, wherein the Cartesian plot includes the feature information extracted at the first angular orientation.

According to yet another aspect of the invention, a computer readable storage medium having stored thereon a computer program comprising instructions which when executed by a computer cause the computer to generate a two-dimensional (2D) plot of pixels corresponding to an attribute of a structure that has been imaged in a three-dimensional (3D) imaging session, the 2D plot having a first axis corresponding to an longitudinal location extending along a central axis of the structure and a second axis corresponding to an angular orientation of the attribute within the structure with respect to the central axis of the structure, wherein each pixel of the 2D plot of pixels illustrates a magnitude of the attribute at a respective longitudinal location and angular orientation.

These and other advantages and features will be more readily understood from the following detailed description of preferred embodiments of the invention that is provided in connection with the accompanying drawings.

DETAILED DESCRIPTION

Diagnostics devices comprise x-ray systems, magnetic resonance (MR) systems, ultrasound systems, computed tomography (CT) systems, positron emission tomography (PET) systems, ultrasound, nuclear medicine, and other types of imaging systems. Applications of x-ray sources comprise imaging, medical, security, and industrial inspection applications. However, it will be appreciated by those skilled in the art that an implementation is applicable for use with single-slice or other multi-slice configurations. Moreover, an implementation is employable for the detection and conversion of x-rays. However, one skilled in the art will further appreciate that an implementation is employable for the detection and conversion of other high frequency electromagnetic energy. An implementation is employable with a "third generation" CT scanner and/or other CT systems.

The operating environment of the present invention is described with respect to a sixty-four-slice computed tomography (CT) system. However, it will be appreciated by those skilled in the art that the present invention is equally applicable for use with other multi-slice configurations, and with systems having a capability of shifting, or "wobbling" the focal spot during operation. Moreover, the present invention will be described with respect to the detection and conversion of x-rays. However, one skilled in the art will further appreciate that the present invention is equally applicable for the detection and conversion of other high frequency electromagnetic energy. The present invention will be described with respect to a "third generation" CT scanner, but is equally applicable with other CT systems.

A dual energy CT system and method is disclosed. Embodiments of the invention support the acquisition of both anatomical detail as well as tissue characterization information for medical CT, and for components within luggage. Energy discriminatory information or data may be used to reduce the effects of beam hardening and the like. The system supports the acquisition of tissue discriminatory data and therefore provides diagnostic information that is indicative of disease or other pathologies. This detector can also be used to detect, measure, and characterize materials that may be injected into the subject such as contrast agents and other specialized materials by the use of optimal energy weighting to boost the contrast of iodine and calcium (and other high atomic or materials). Contrast agents can, for example, include iodine that is injected into the blood stream for better visualization. For baggage scanning, the effective atomic number generated from energy sensitive CT principles allows reduction in image artifacts, such as beam hardening, as well as provides addition discriminatory information for false alarm reduction.

Figure 1:
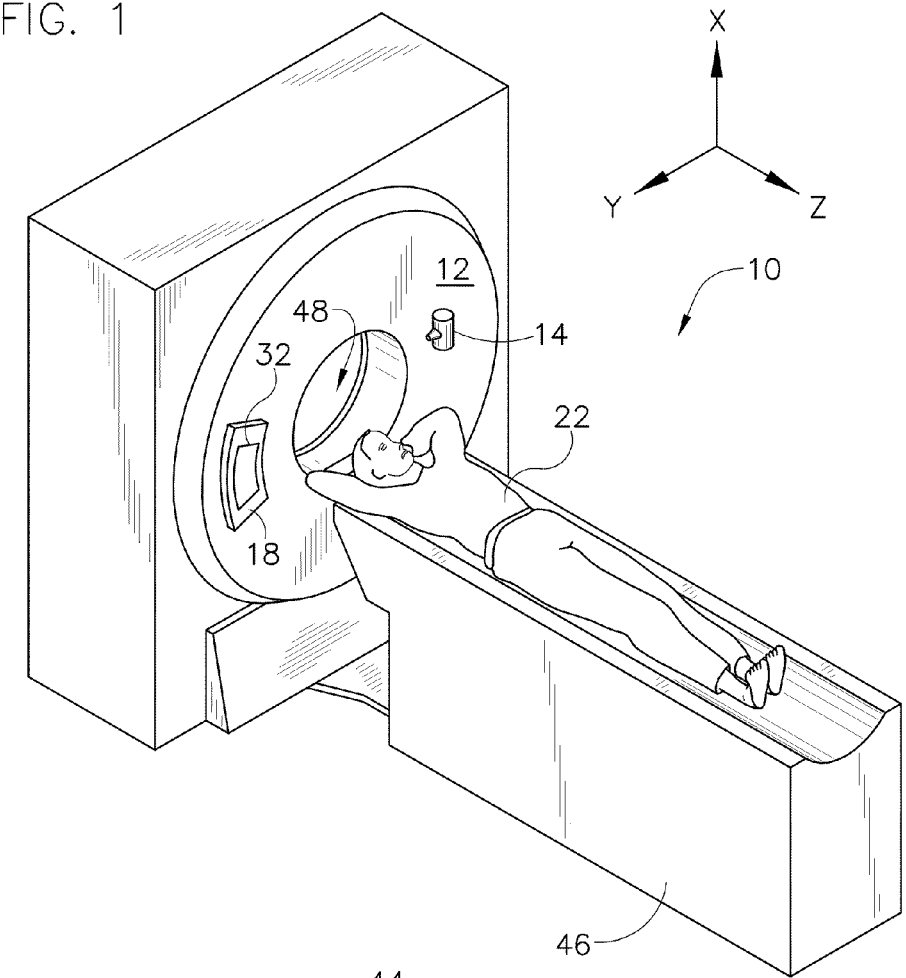
FIG. 1 is a pictorial view of a CT imaging system.
Figure 2:
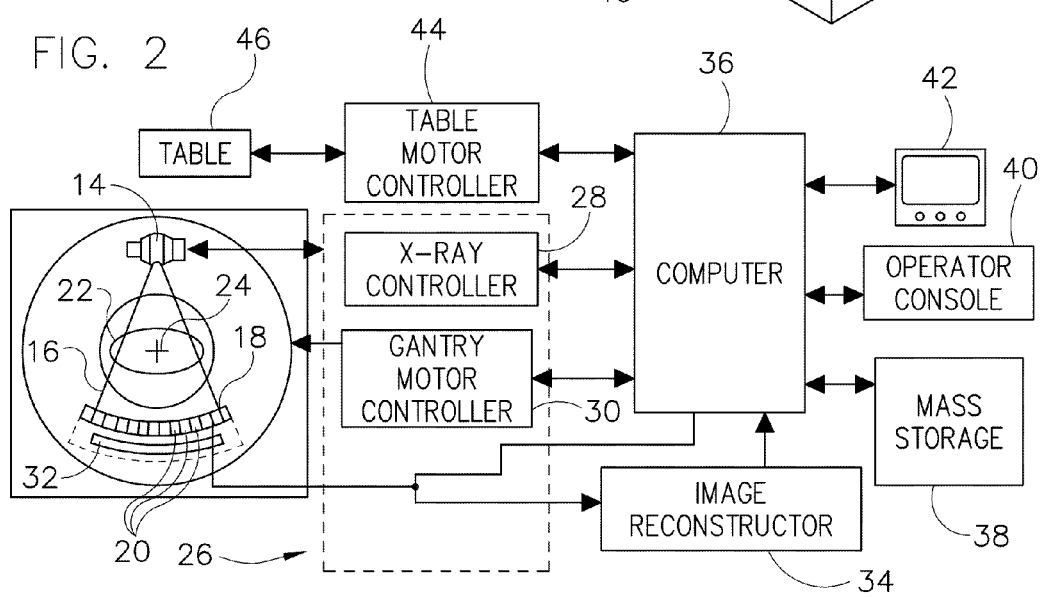
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector assembly 18 that includes a collimator on the opposite side of the gantry 12. In embodiments of the invention, x-ray source 14 includes either a stationary target or a rotating target. Detector assembly 18 is formed by a plurality of detectors 20 and data acquisition systems (DAS) 32. The plurality of detectors 20 sense the projected x-rays that pass through a medical patient 22, and DAS 32 converts the data to digital signals for subsequent processing. Each detector 20 produces an analog electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 and generator 29 that provides power and timing signals to x-ray source 14 and a gantry motor controller 30 that controls the rotational speed and position of gantry 12. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has some form of operator interface, such as a keyboard, mouse, voice activated controller, or any other suitable input apparatus. An associated display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves patients 22 through a gantry opening 48 of FIG. 1 in whole or in part.

System 10 may be operated in either monopolar or bipolar modes. In monopolar operation, either the anode is grounded and a negative potential is applied to the cathode, or the cathode is grounded and a positive potential is applied to the anode. Conversely, in bipolar operation, an applied potential is split between the anode and the cathode. In either case, monopolar or bipolar, a potential is applied between the anode and cathode, and electrons emitting from the cathode are caused to accelerate, via the potential, toward the anode. When, for instance, a −140 kV voltage differential is maintained between the cathode and the anode and the tube is a bipolar design, the cathode may be maintained at, for instance, −70 kV, and the anode may be maintained at +70 kV. In contrast, for a monopolar design having likewise a −140 kV standoff between the cathode and the anode, the cathode accordingly is maintained at this higher potential of −140 kV while the anode is grounded and thus maintained at approximately 0 kV. Accordingly, the anode is operated having a net 140 kV difference with the cathode within the tube.

Figure 3:
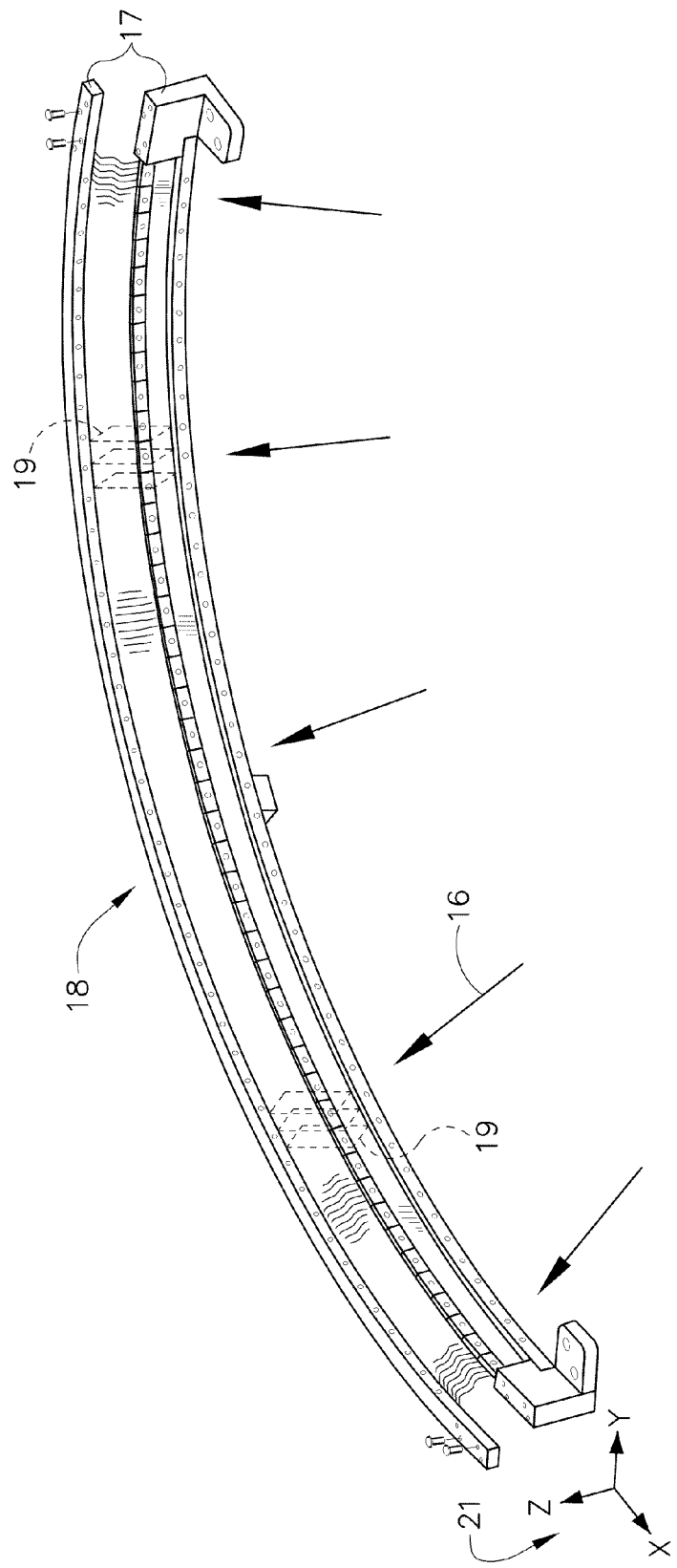
FIG. 3 is a perspective view of one embodiment of a CT system detector array.

As shown in FIG. 3, detector assembly 18 includes rails 17 having collimating blades or plates 19 placed therebetween. Plates 19 are positioned to collimate x-rays 16 before such beams impinge upon, for instance, detector 20 of FIG. 4 positioned on detector assembly 18. In one embodiment, detector assembly 18 includes 57 detectors 20, such as will be illustrated, each detector 20 having an array size of 64×16 of pixel elements 50. As a result, detector assembly 18 has 64 rows and 912 columns (16×57 detectors) which allows 64 simultaneous slices of data to be collected with each rotation of gantry 12.

Figure 4:
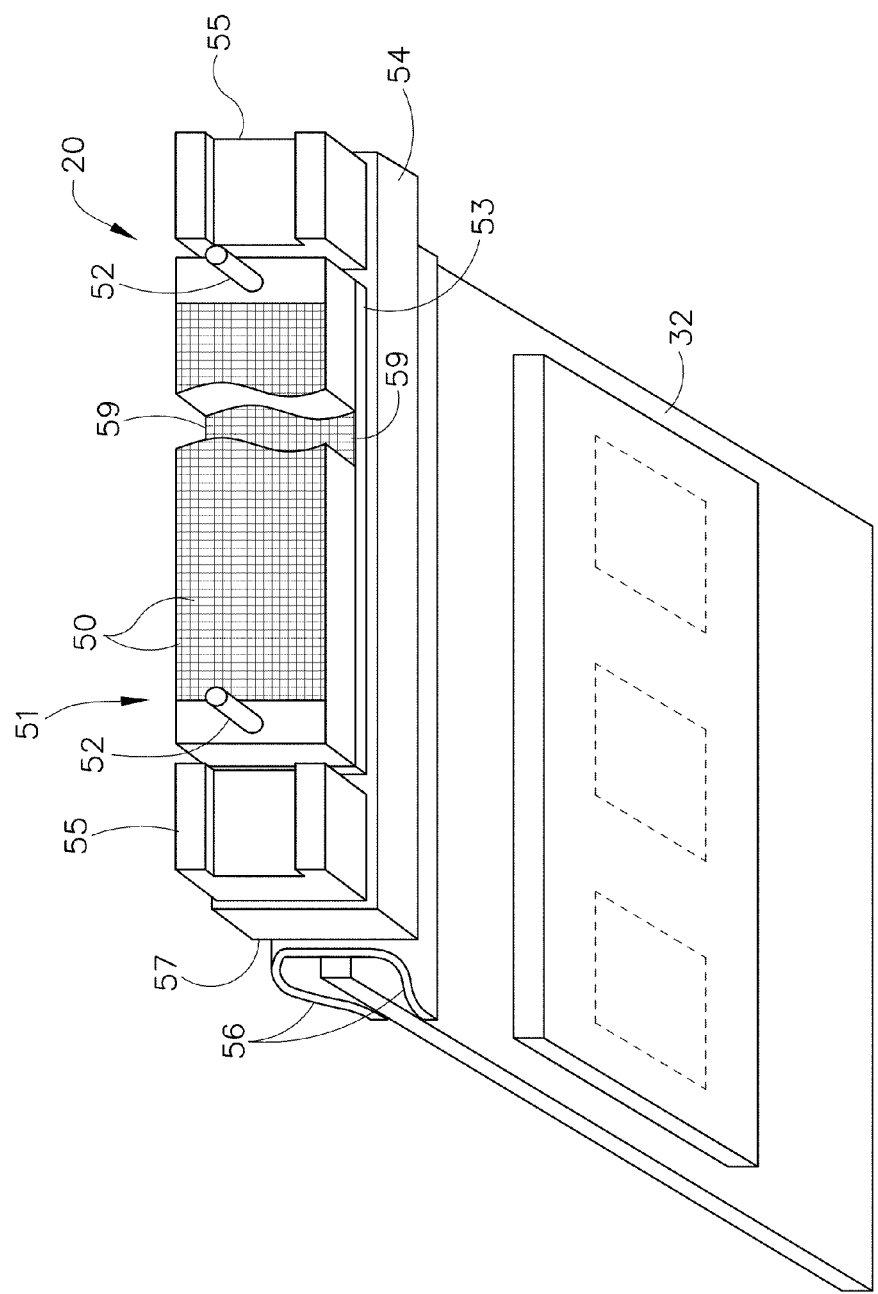
FIG. 4 is a perspective view of one embodiment of a detector.

Referring to FIG. 4, detector 20 includes DAS 32, with each detector 20 including a number of detector elements 50 arranged in pack 51. Detectors 20 include pins 52 positioned within pack 51 relative to detector elements 50. Pack 51 is positioned on a backlit diode array 53 having a plurality of diodes 59. Backlit diode array 53 is in turn positioned on multi-layer substrate 54. Spacers 55 are positioned on multi-layer substrate 54. Detector elements 50 are optically coupled to backlit diode array 53, and backlit diode array 53 is in turn electrically coupled to multi-layer substrate 54. Flex circuits 56 are attached to face 57 of multi-layer substrate 54 and to DAS 32. Detectors 20 are positioned within detector assembly 18 by use of pins 52.

In the operation of one embodiment, x-rays impinging within detector elements 50 generate photons which traverse pack 51, thereby generating an analog signal which is detected on a diode within backlit diode array 53. The analog signal generated is carried through multi-layer substrate 54, through flex circuits 56, to DAS 32 wherein the analog signal is converted to a digital signal.

Figure 5:
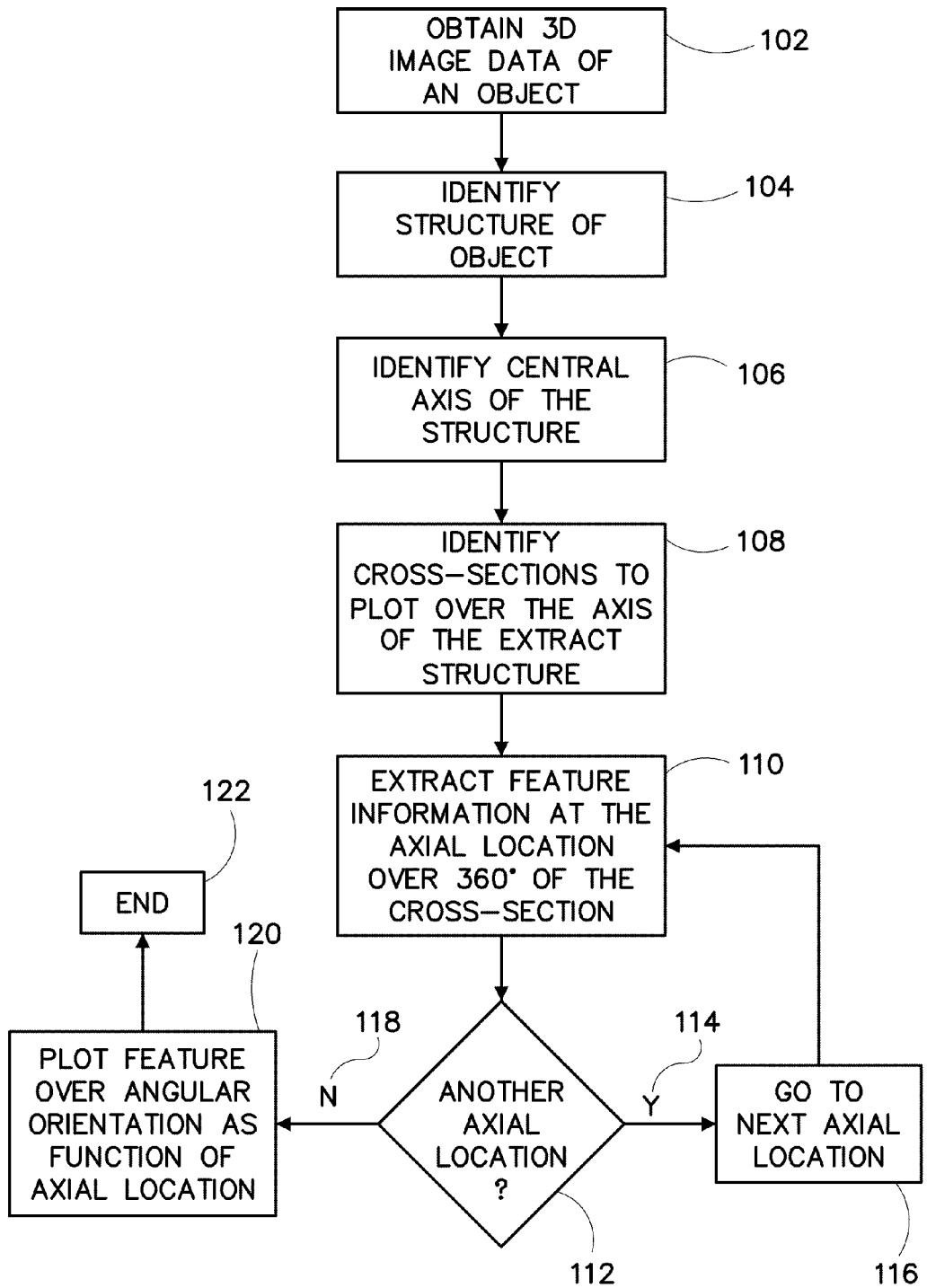
FIG. 5 is a flowchart illustrating a technique for plotting feature information from three-dimensional (3D) image data, according to an embodiment of the invention

FIG. 5 illustrates a technique 100 for plotting attribute or feature information from three-dimensional (3D) image data on a two dimensional plot, according to an embodiment of the invention. 3D imaging data is obtained of an object such as patient 22 of FIGS. 1 and 2 at step 102. According to an embodiment of the invention, the 3D imaging data obtained may be generated using a CT imaging system (single or multi-energy), an MR imaging system, or other imaging modalities including but not limited to ultrasound, PET, SPECT, and the like. The 3D imaging data may be obtained concurrently in an imaging session and subsequently plotted, or may be obtained from a prior imaging session, as examples.

Once the 3D imaging data is obtained, a structure of the object is defined or identified therein at step 104, and in one embodiment, the structure is an internal structure of the object that is generally tubular in shape. According to embodiments of the invention, the internal structure may be identified by first generating a 3D image from the imaging data, or the internal structure may be identified algorithmically within the data itself and as understood in the art by foregoing the actual 3D image generation. For instance, blood, cartilage, bone, contrast agent, and the like, may be identified within 3D imaging data that may exhibit properties that enable their identification without the need for generating a 3D image. Conversely, a user may choose to have a 3D image generated after being prompted during use of a computer program, according to an embodiment of the invention. The user may then visually select an internal structure for further analysis from the generated 3D image, such as a coronary vessel, a lung airway, and a trachea, as examples. Regardless, as will be described, features of 3D imaging data may be extracted from the identified internal structure and plotted or visualized according to embodiments of the invention. According to embodiments of the invention, a feature or parameter-of-interest that may be plotted or visualized includes but is not limited to distribution of stenosis in a vessel and distribution of wall thickness in a vessel, as examples.

Figure 6:
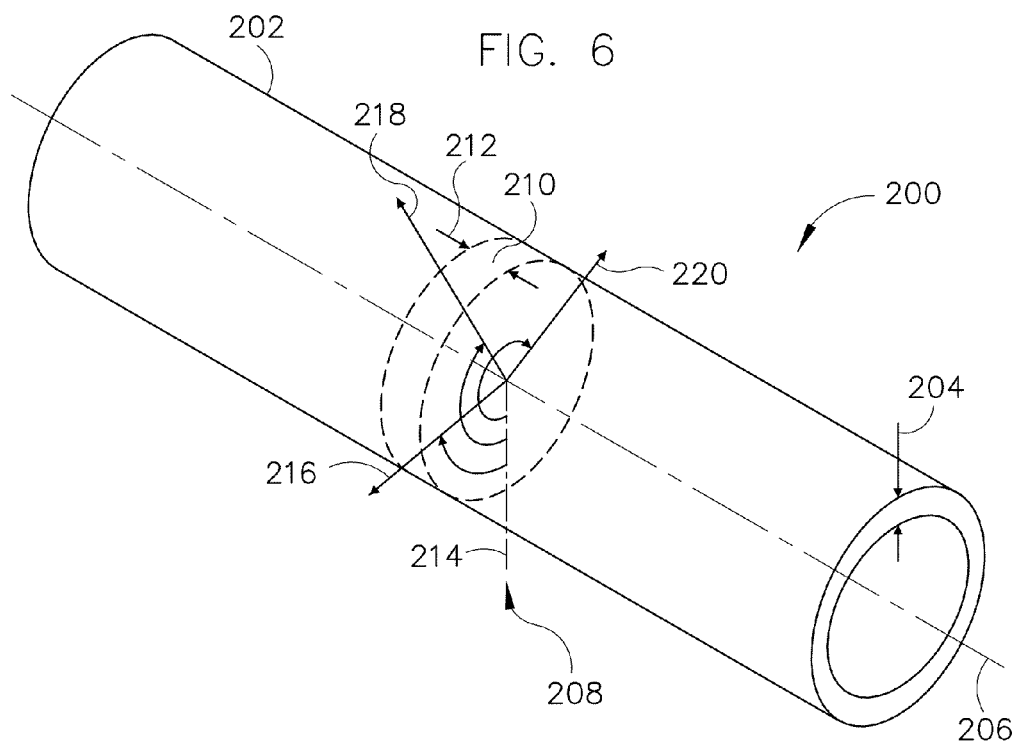
FIG. 6 illustrates a substantially tubular or cylindrical shape that may be viewed according to embodiments of the invention.

FIG. 6 illustrates a perspective view of a structure 200 that may be identified as an internal structure according to an embodiment of the invention as described in step 104 above. Structure 200 illustrates a substantially tubular or cylindrical shape that may be, for instance, a blood vessel or a trachea within a 3D image of an object (not shown). Structure 200 includes a wall 202 having a thickness 204, and structure 200 extends along a central or longitudinal axis 206. At a first axial location 208 that is longitudinally displaced along central axis 206, a cross-section 210 is illustrated having a thickness 212. Cross-section 210 includes an angular reference axis 214 that may be arbitrarily selected or that may have its location be selected based on other reference features within structure 200. Reference axis 214 may also be selected based on an orientation of structure 200 within the object such as patient 22 of FIGS. 1 and 2 as an example. Cross-section 210 includes representative rays or vectors that include a first vector or ray 216, a second vector or ray 218, and a third vector or ray 220 extending from central axis 206. Cross-section 210 is one of multiple cross-sections that may be identified and from which feature information may be extracted and plotted, according to the invention.

Figure 7:
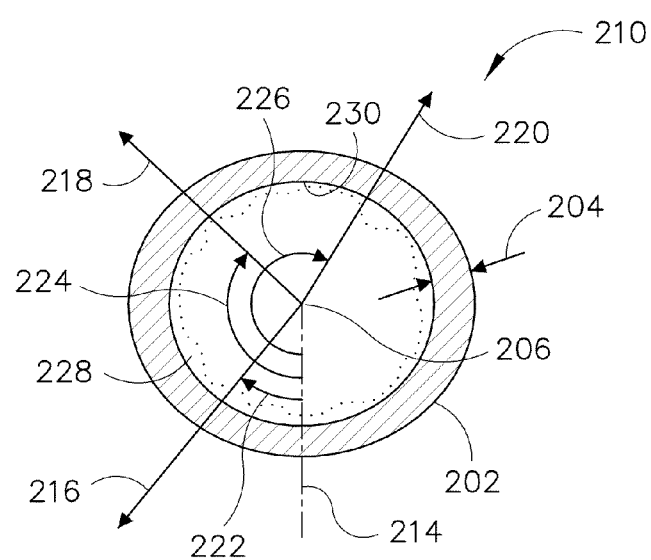
FIG. 7 illustrates a plan view of a cross-section of the shape illustrated in FIG. 6.

A plan view of cross-section 210 is illustrated in FIG. 7 and includes rays 216-220 extending from central axis 206. Cross-section 210 includes reference axis 214, and rays 216-220 are each illustrated having an angular relationship with respect to a base vector or reference axis 214. First ray 216 is illustrated having a first angle 222 from reference axis 214, second ray 218 is illustrated having a second angle 224 from reference axis 214, and third ray 220 is illustrated having a third angle 226 from reference axis 214. Thus, at each illustrated angle 222-226, respective rays 216-220 pass from central axis 206 and through wall 202 of cross-section 210. Along each ray 216-220 of cross-section 210, feature information or a parameter-of-interest may be extracted from the 3D imaging data, according to embodiments of the invention. Cross-section 210 illustrates plaque 228 that may exist in cross-section 210. As illustrated in cross-section 210, plaque 228 includes a varying amount of thickness around an inner circumference 230 of wall 202.

According to an embodiment of the invention, a feature of structure 200 that may be desirable to visualize may be a wall thickness, an amount of plaque, a chemical composition, or a material density, as examples. Accordingly, each ray 216-220 may pass through material, such as plaque 228, or through wall 202. When the 3D image data or images include material content information, such as may be obtained using dual-energy imaging techniques as an example, the feature of structure 200 that may be desirable to visualize may be chemical composition or material density. Further, although three rays 216-220 are illustrated, it is to be understood that rays 216-220 are but representative angular illustrations and that data may be obtained over an entire 360° circumference of cross-section 210.

Referring back to FIGS. 5 and 6, once 3D image data is obtained at step 102, and once structure 200 of 3D image data is identified at step 104, a central axis of structure 200 is identified at step 106. A plurality of cross-section locations along a length of the central axis is identified at step 108, and one or more parameters-of-interest or features is extracted at step 110 from structure 200 at one of the identified cross-section locations, according to embodiments of the invention. In one embodiment, the one or more parameters-of-interest or features is extracted over 360°, and in other embodiments, the one or more parameters-of-interest or features is extracted is extracted over an angle less than over 360°. After feature information of a cross-section at the one identified cross-section location is extracted at step 110, technique 100 next inquires at step 112 as to whether another identified cross-section location is to be considered for feature extraction. If so 114, then technique 100 proceeds to the next identified cross-section location at step 116, and feature information is extracted therefrom at step 110. However, if no further identified cross-section location exists to have features extracted 118, then a plot of the feature or extracted information is generated as a visualization map at step 120 showing the extracted feature as a function of axial location and as a function of its angular orientation, and technique 100 ends at step 122.

Figure 8:
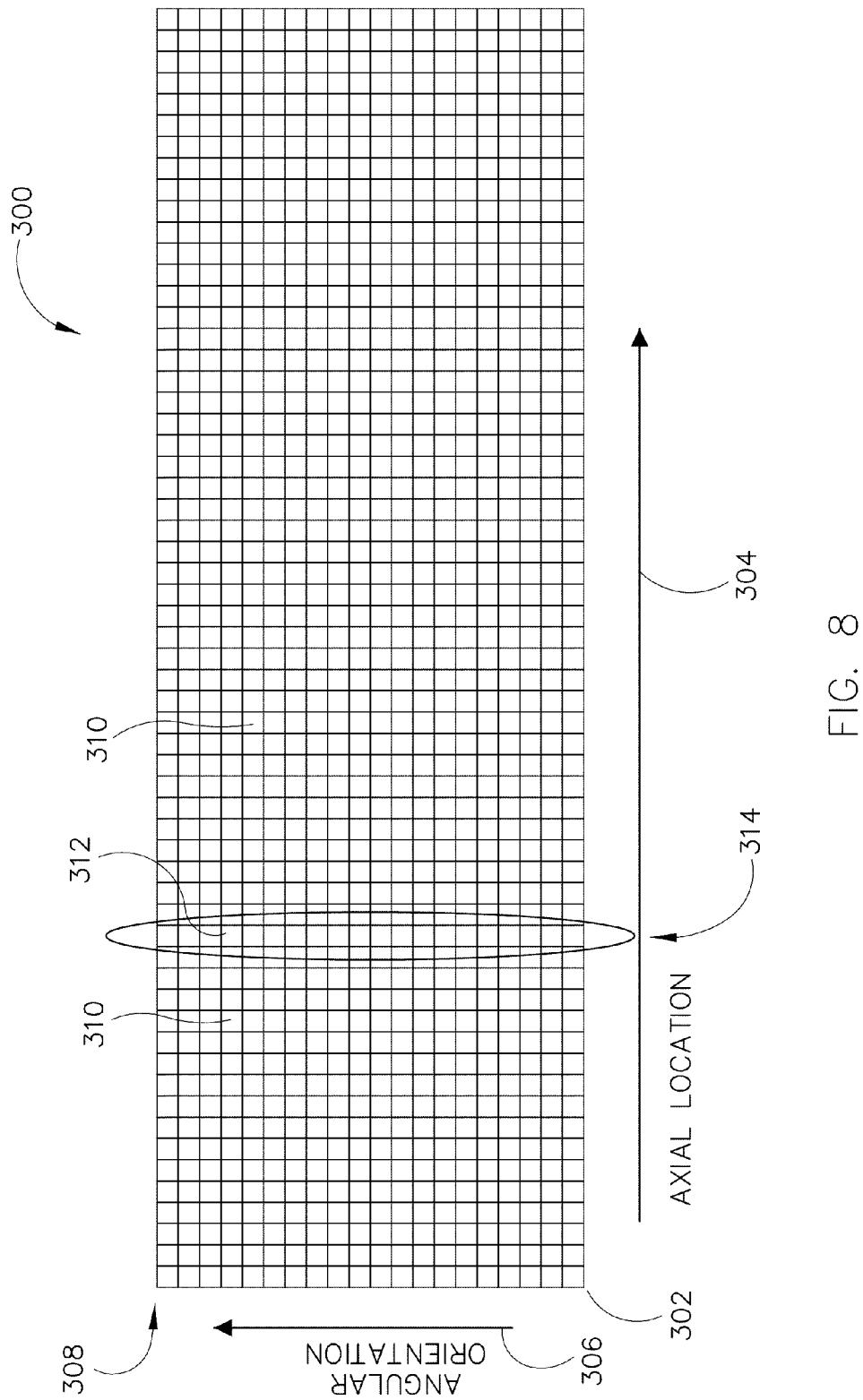
FIG. 8 illustrates a two-dimensional (2D) plot for illustrating feature information extracted from a 3D image, according to an embodiment of the invention.

Extracted feature information or data extracted from a 3D image may be plotted as a two-dimensional (2D) plot or visualization map as illustrated with respect to FIG. 8 according to an embodiment of the invention. Referring now to FIG. 8, a plot 300 includes an origin 302 and represents a 2D Cartesian plot having an X-axis or abscissa 304 and a Y-axis or ordinate 306. X-axis 304 corresponds to an axial location as measured along, for instance, central axis 206 of structure 200. Y-axis 306 corresponds to an angular orientation of the data measured at the axial locations along X-axis 304. Y-axis 306 typically ranges through 360° of rotation from a starting angle, such as 0°, to a maximum angular orientation or ending angle 308 typically matching the starting angle.

Plot 300 includes a plurality of pixels 310 that each contain information extracted at respective axial locations and angular orientations thereof at step 110 of technique 100. In embodiments of the invention, extracted data may be plotted in pixels 310 such that the extracted data may be quickly and visually understood by an observer of plot 300. Thus, data measured may include a wall thickness, an amount of plaque, a chemical composition, or a material density, as examples, which may be visually represented in pixels 310 as a color, a gray-scale shading, and an elevation, as examples. Plot 300 includes a set of pixels 312 at an axial location 314 that, for illustration purposes, corresponds to cross-section 210 located at first axial location 208 of FIG. 6. Pixels at the first axial location 208/314 are illustrated in FIG. 9.

Figure 9:
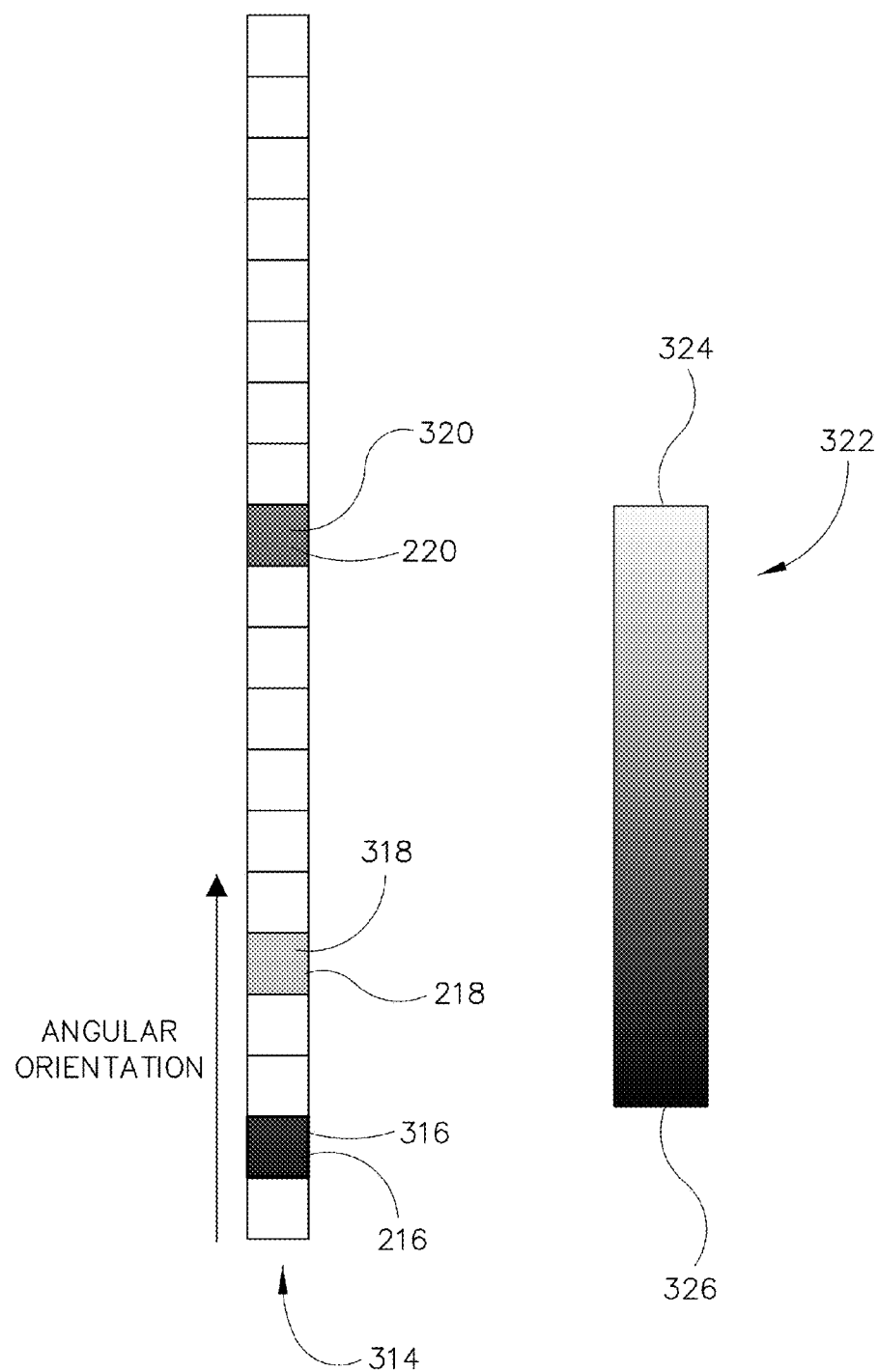
FIG. 9 illustrates a set of pixels at an axial location of the 2D plot of FIG. 8.

Referring now to FIG. 9, and also referring back to FIGS. 6 and 7, the set of pixels 312 at axial location 314 is illustrated having a first pixel or region 316, a second region 318, and a third region 320. Regions 316-320 correspond, respectively, to rays 216-220 of cross-section 210. A legend 322 having a black/white or gray-scale continuum of shading extends from fully unshaded 324 to fully shaded 326 and represents, in this example, a level of shading that corresponds to a thickness of plaque. As illustrated, regions 316-320 include an amount of shading that corresponds, in an example, to an amount of plaque 228 measured in cross-section 210, along respective rays 216-220 at respective angles 222-226. In such fashion, a shading within pixels 216-220 may be compared visually to a level of shading within legend 322 in order to make a quick and accurate determination as to the plaque thickness in structure 200. Thus, cells or pixels 216-220 may be mapped back quickly and efficiently to structure 200, instead of having to look through multiple cross-sections or slices of structure 200 to find and quantify a feature or parameter-of-interest.

Thus, FIG. 9 illustrates three exemplary pixels having shading that corresponds to an amount of plaque extracted from 3D imaging data. It is to be understood that the three pixels illustrated 316-320 are illustrated for exemplary purposes, and that, according to embodiments of the invention, all pixels 312 of cross-section 210 may be shaded having a level of shading that corresponds to a thickness of plaque at a respective angle. It is to be further understood that, although only cross-section 210 at axial location 314 is illustrated in FIG. 9, all pixels throughout along X-axis 304 of plot 300 in FIG. 8 may be so illustrated in order that plot 300 may be used to quickly and efficiently discern a plaque thickness within structure 200 and along its entire axial length. Thus, when plotting plot 300, a length of X-axis 304 is selected to correspond to a length of structure 200 such that the entire structure 200 is visible in a 2D representation.

Further, although a black/white continuum is illustrated in legend 322, it is to be understood that a color coding or an elevation or magnitude of each pixel may be used to illustrate a feature or parameter-of-interest, according to embodiments of the invention. Thus, data measured may include a wall thickness, an amount of plaque, a chemical composition, or a material density, as examples, all of which may be visually represented in pixels 310 as a color, a gray-scale shading, and an elevation, as examples, and which may be discerned by legend 322. Further, one aspect of the invention includes an ability to view the visualization map of FIG. 8 and quickly and efficiently highlight or identify a point of interest and traverse between the 2D visualization map and the 3D image from which the 2D visualization map is generated. This visualization map also serves as input to automatic detection such as segmenting of plaque lesions. Thus, by identifying a point of interest by, for instance, selecting or clicking on a point that may be of interest in the 2D plot, a computer program may then be able to move, based on the point selected, back to the 3D image in order to enable the viewer to quickly and efficiently find the location of interest and further study it in the 3D image. Thus, a user may be able to quickly pinpoint spots or points of interest for further study and avoid having to navigate an entire volume of the 3D image.

And, although structure 200 is illustrated as having substantially a linear shape, it is to be understood that structure 200 is shown as such for illustration purposes, and that structure 200 may include substantially non-linear shapes such as a blood vessel that includes curves, twists, and bends, and that a cross-section thereof may likewise be variable along its length. Further, despite the linear and smooth-walled rendition of structure 200, it is to be understood that structure 200, having generally a tubular or cylindrical shape, includes a central axis that may be identified therein, as understood in the art. Further, although wall thickness 204 of structure 200 in FIG. 6 is illustrated as having a uniform thickness along central axis 206, it is to be understood that a thickness of wall 202 is typically variable and is one of the parameters that can be plotted according to the invention. Thus, although FIG. 6 is illustrated as having a linear shape, a smooth wall, and a uniform wall thickness, it is to be understood that such is only for illustration purposes of identifying an exemplary cross-section of a structure, and illustrating representative rays about axis 206 for plotting purposes, according to embodiments of the invention. Further, although FIG. 6 is illustrated as having a tubular shape, it is to be understood that such is for illustration purposes of identifying the internal structure and its axis, and that any structure may have features visualized along a longitudinal axis thereof, according to the invention. Embodiments of the invention described herein are in no way limited to the structures illustrated, but are applicable to any structure that can be identified as having a central axis therein and features which may be extracted from 3D imaging data along rays extending from the central axis thereof.

Figure 10:
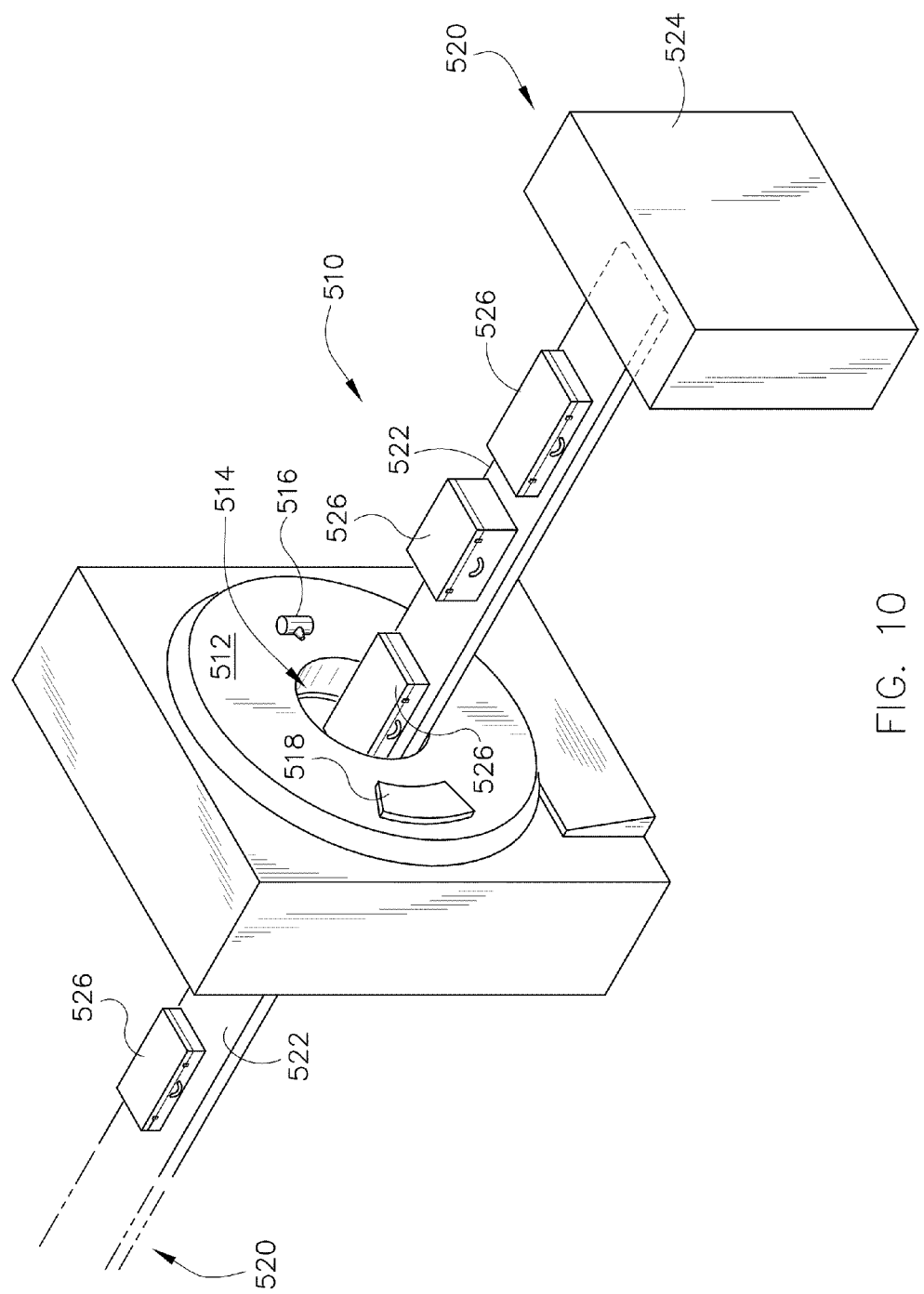
FIG. 10 is a pictorial view of a CT system for use with a non-invasive package inspection system according to an embodiment of the invention.

Referring now to FIG. 10, package/baggage inspection system 510 includes a rotatable gantry 512 having an opening 514 therein through which packages or pieces of baggage may pass. The rotatable gantry 512 houses a high frequency electromagnetic energy source 516 as well as a detector assembly 518 having scintillator arrays comprised of scintillator cells similar to that shown in FIG. 4. A conveyor system 520 also is provided and includes a conveyor belt 522 supported by structure 524 to automatically and continuously pass packages or baggage pieces 526 through opening 514 to be scanned. Objects 526 are fed through opening 514 by conveyor belt 522, imaging data is then acquired, and the conveyor belt 522 removes the packages 526 from opening 514 in a controlled and continuous manner. As a result, postal inspectors, baggage handlers, and other security personnel may non-invasively inspect the contents of packages 526 for explosives, knives, guns, contraband, etc.

An implementation of embodiments of the invention in an example comprises a plurality of components such as one or more of electronic components, hardware components, and/or computer software components. A number of such components can be combined or divided in an implementation of the embodiments of the invention. An exemplary component of an implementation of the embodiments of the invention employs and/or comprises a set and/or series of computer instructions written in or implemented with any of a number of programming languages, as will be appreciated by those skilled in the art.

An implementation of the embodiments of the invention in an example employs one or more computer readable storage media. An example of a computer-readable storage medium for an implementation of embodiments of the invention comprises the recordable data storage medium of the image reconstructor 34, and/or the mass storage device 38 of the computer 36. A computer-readable storage medium for an implementation of embodiments of the invention in an example comprises one or more of a magnetic, electrical, optical, biological, and/or atomic data storage medium. For example, an implementation of the computer-readable signal-bearing medium comprises floppy disks, magnetic tapes, CD-ROMs, DVD-ROMs, hard disk drives, and/or electronic memory.

A technical contribution for the disclosed method and apparatus is that it provides for a computer-implemented apparatus and method of visualizing features in an image.

According to an embodiment of the invention, an imaging system includes a detector configured to receive data that can be reconstructed into a three-dimensional (3D) image of an object, and a computer programmed to obtain 3D image data of the object, the 3D image data including an internal structure of the object, define a longitudinal dimension of the internal structure from the 3D image data along a length of the structure, extract a first set of parameter-of-interest data related to the internal structure from the 3D image data along a first ray extending from a first location along the length of the structure and at a first angular orientation with respect to a base vector that is generally perpendicular to the longitudinal dimension, and plot the extracted first set of parameter-of-interest data at a pixel location of a two-dimensional (2D) plot that corresponds to the first location and corresponds to the first angular orientation.

According to another embodiment of the invention, a method of viewing imaging data includes identifying a tubular structure in three-dimensional (3D) image data of an object, identifying a central axis extending along a length of the tubular structure, extracting feature information of the tubular structure at a first longitudinal location of the central axis and extending along a vector passing from the first longitudinal location at a first angular orientation and through the structure, and generating a Cartesian plot of the tubular structure, the Cartesian plot having a first axis corresponding to longitudinal displacements of the extracted feature information of the tubular structure from an initial central point and having a second axis corresponding to angular orientations of vectors extending from the central axis, wherein the Cartesian plot includes the feature information extracted at the first angular orientation.

According to yet another embodiment of the invention, a computer readable storage medium having stored thereon a computer program comprising instructions which when executed by a computer cause the computer to generate a two-dimensional (2D) plot of pixels corresponding to an attribute of a structure that has been imaged in a three-dimensional (3D) imaging session, the 2D plot having a first axis corresponding to an axial location extending along a central axis of the structure and a second axis corresponding to an angular orientation of the attribute within the structure with respect to the central axis of the structure, wherein each pixel of the 2D plot of pixels illustrates a magnitude of the attribute at a respective axial location and angular orientation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Furthermore, while single energy and dual-energy techniques are discussed above, the invention encompasses approaches with more than two energies. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A multi-energy imaging system comprising:
 a detector configured to receive data that can be reconstructed into a three-dimensional (3D) image of an object; and
 a computer programmed to:
  obtain 3D image data of the object, the 3D image data comprising multi-energy image data;
  identify an internal structure of the object via one of a blood content, a cartilage content, a bone content, and a contrast agent content;
  define a longitudinal dimension of the internal structure from the 3D image data along a length of the structure;
  extract a first set of parameter-of-interest data related to the internal structure from the 3D image data along a first ray extending from a first location along the length of the structure and at a first angular orientation with respect to a base vector that is generally perpendicular to the longitudinal dimension, the first set of parameter-of-interest data comprising an amount of plaque in the internal structure at the first location and the first angular orientation; and plot the extracted first set of parameter-of-interest data at a pixel location of a two-dimensional (2D) plot that corresponds to the first location and corresponds to the first angular orientation, wherein the 2D plot comprises a first axis corresponding to longitudinal locations along the length of the internal structure and a second axis corresponding to an angular orientation with respect to the length of the internal structure.

2. The imaging system of claim 1 wherein the computer is programmed to:

extract a second set of parameter-of-interest data related to the internal structure from the 3D image data along a second ray extending from the first location along the length and at a second angular orientation with respect to the base vector; and plot the second set of parameter-of-interest data on the 2D plot that corresponds to the first location and to the second angular orientation.

3. The imaging system of claim 1 wherein the computer is programmed to generate a 3D image of the object using the 3D image data, and wherein the computer is programmed to prompt a user to identify the internal structure within the 3D image.

4. The imaging system of claim 1 wherein the internal structure of the object is generally tubular-shaped and wherein the length extends along a central axis of the tubular-shaped internal structure.

5. The imaging system of claim 1 wherein the computer is further programmed to:

extract data corresponding to a wall thickness at the first location and the first angular orientation; and plot the extracted wall thickness on a 2D plot that corresponds to the first location and the first angular orientation.

6. The imaging system of claim 1 wherein the internal structure of the object is one of a blood vessel and a trachea.

7. The imaging system of claim 1 wherein the computer is further programmed to:

extract data representing a chemical composition of the internal structure at the first location and the first angular orientation; and plot the chemical composition on a 2D plot that corresponds to the first location and the first angular orientation.

8. The imaging system of claim 1 wherein the computer is further programmed to:

extract data representing a material density of the internal structure at the first location and the first angular orientation; and plot the material density on a 2D plot that corresponds to the first location and the first angular orientation.

9. The imaging system of claim 1 wherein the computer is further programmed to visually represent the amount of plaque at the pixel location with a level of shading from a legend corresponding to the amount of plaque.

10. A method of generating a medical image comprising:

acquiring energy sensitive three-dimensional (3D) image data of an object from a multi-energy medical imaging device;

selectively weighting the energy sensitive 3D image data to boost a contrast of at least one material of the object represented in the energy sensitive 3D image data;

reconstructing a 3D image of the object using the energy sensitive 3D image data;

identifying a tubular structure in the 3D image via one of a blood content, a cartilage content, a bone content, and a contrast agent content;

identifying a central axis extending along a length of the tubular structure;

extracting feature information comprising a chemical composition of the tubular structure at a first longitudinal location of the central axis and extending along a vector passing from the first longitudinal location at a first angular orientation and through the structure; and generating a Cartesian plot comprising a plurality of pixels visually representing the chemical composition of the tubular structure, the Cartesian plot having a first axis corresponding to longitudinal displacements of the extracted feature information of the tubular structure from an initial central point and having a second axis corresponding to angular orientations of vectors extending from the central axis, wherein the Cartesian plot includes the feature information extracted at the first angular orientation.

11. The method of claim 10 wherein acquiring comprises acquiring the 3D image data using one of a computed tomography (CT) system and a magnetic resonance (MR) imaging system.

12. The method of claim 10 wherein acquiring comprises acquiring the 3D image data using a multi-energy CT imaging system.

13. The method of claim 10 wherein generating the Cartesian plot comprises plotting the chemical composition as one of a color and a gray-scale shading corresponding to a legend.

14. The method of claim 10 wherein generating the Cartesian plot comprises plotting the chemical composition as an elevation.

15. The method of claim 10 wherein identifying the tubular structure in the 3D image comprises visually selecting the structure in the 3D image.

16. The method of claim 10 wherein the tubular structure of the object is one of a blood vessel and a trachea.

17. The method of claim 10 further comprising:

extracting material density information of the tubular structure; and representing the material density information in the Cartesian plot.

18. The method of claim 10 further comprising:

extracting plaque thickness information of the tubular structure; and representing the plaque thickness information in the Cartesian plot.

19. A non-transitory computer readable storage medium having stored thereon a computer program comprising instructions, which, when executed by a computer, cause the computer to:

identify a structure from a three-dimensional (3D) image data set acquired from a multi-energy imaging system via one of a blood content, a cartilage content, a bone content, and a contrast agent content;

generate a two-dimensional (2D) plot of pixels representing the structure, the 2D plot having a first axis corresponding to a longitudinal location extending along a central axis of the structure and a second axis corresponding to an angular orientation of the attribute within the structure with respect to the central axis of the structure;

wherein each pixel of the 2D plot of pixels illustrates a magnitude of the material density of the structure at a respective longitudinal location and angular orientation; and wherein each pixel of the 2D plot of pixels comprises tissue discriminatory data.

20. The computer readable storage medium of claim 19 wherein the magnitude is illustrated via one of a color and a gray-scale shading.

21. The computer readable storage medium of claim 19 wherein the instructions further cause the computer to generate a second 2D plot of pixels, wherein each pixel of the second 2D plot of pixels illustrates a chemical composition of the structure at the respective longitudinal location and angular orientation.

22. The computer readable storage medium of claim 19 wherein the internal structure of the object is one of a blood vessel and a trachea.

23. The computer readable storage medium of claim 19 wherein the magnitude is illustrated in the 2D plot as an elevation.

24. The computer readable storage medium of claim 19 wherein the instructions further cause the computer to generate a third 2D plot of pixels, wherein each pixel of the third 2D plot of pixels illustrates an amount of plaque at the respective longitudinal location and angular orientation.

\* \* \* \* \*